W. A. LANGJAHR.
SPRING RIM FOR WHEELS.
APPLICATION FILED JAN. 2, 1913.
1,063,359.
Patented June 3, 1913.
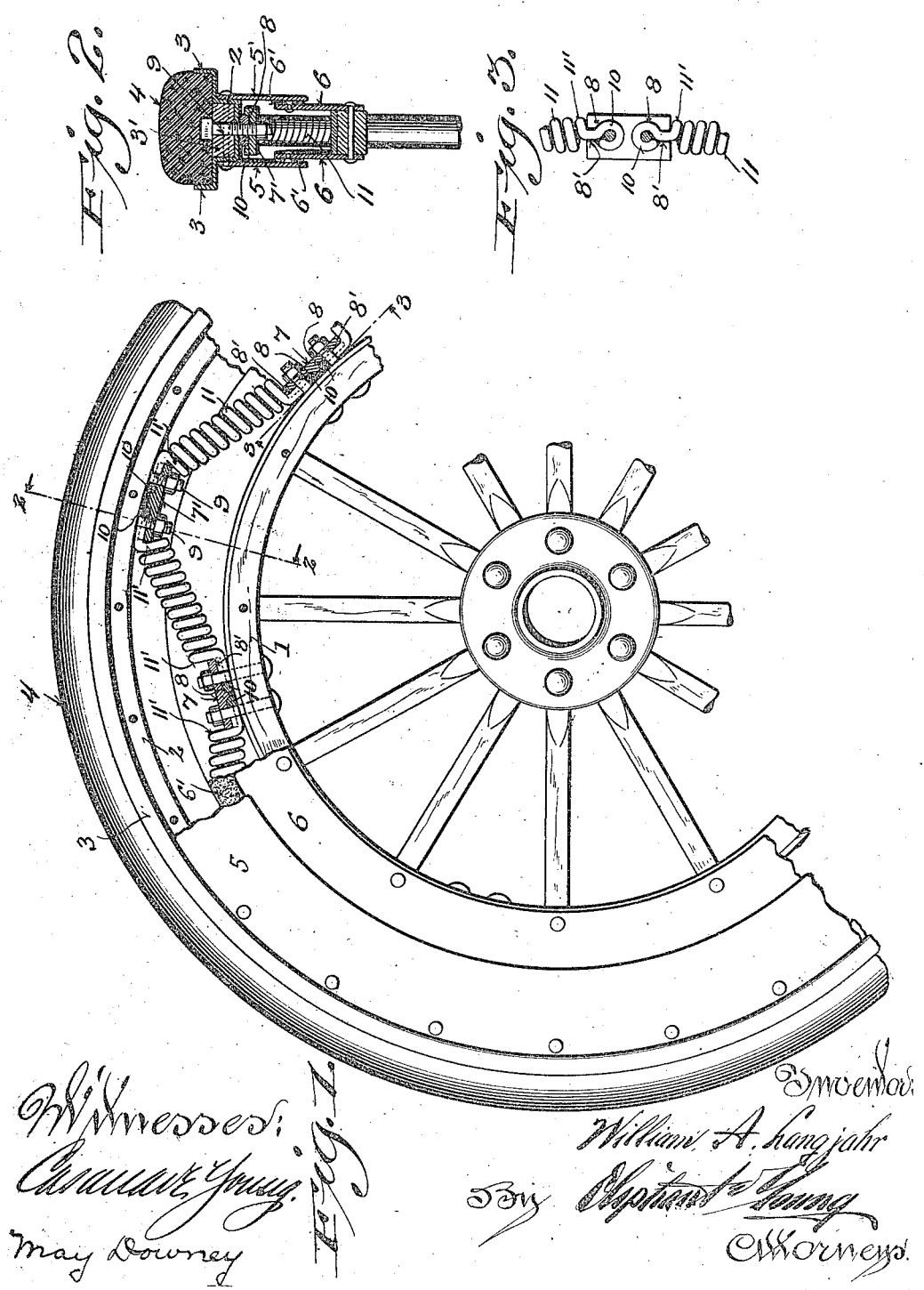

UNITED STATES PATENT OFFICE.

WILLIAM A. LANGJAHR, OF PLYMOUTH, WISCONSIN.

SPRING-RIM FOR WHEELS.

1,063,359.   Specification of Letters Patent.   Patented June 3, 1913.

Application filed January 2, 1913. Serial No. 739,610.

*To all whom it may concern:*

Be it known that I, WILLIAM A. LANGJAHR, a citizen of the United States, and resident of Plymouth, in the county of Sheboygan and State of Wisconsin, have invented certain new and useful Improvements in Spring-Rims for Wheels; and I do hereby declare that the following is a full, clear, and exact description thereof.

The primary object of my invention is to provide a simple, economical and effective spring rim for vehicle wheels.

Other objects are to provide a pair of circular rub-plates between the wheel-felly and a floating rim, whereby rigidity is obtained, the said plates being provided with means for effecting a practically dust-tight joint therebetween; to provide a spring connection between the floating rim and wheel felly in the form of a series of coiled spring units that connect the rim and wheel in the form of a continuous zig-zag; to provide a coupling block for the ends of the spring units that also serves as a buffer for the last coils of the spring ends, the blocks being arranged to abut said spring ends under abnormal load strain at the traction point of the tread, the abutment being coincident to the closing up of the coiled springs, whereby said spring units constitute rigid oblique buffer connections, and thus prevent the floating rim from assuming abnormal eccentricity relative to the wheel proper.

With the above and other objects in view the invention consists in certain peculiarities of construction and combination of parts as hereinafter set forth with reference to the accompanying drawings and subsequently claimed.

In the drawings Figure 1 represents a side elevation of a fragment of a wheel embodying the features of my invention with parts broken away and parts in section to illustrate structural features thereof; Fig. 2, a detailed cross-section, the section being indicated by line 2—2 in Fig. 1, and Fig. 3, a plan view of a tie-block for the spring units, the tie-block being shown with the ends of a pair of said spring units seated therein.

Referring by characters to the drawing, 1 represents the felly of a standard type of wheel, and 2 a floating rim, which rim is channeled as shown in cross-section and provided with side flanges 3 for the reception of a yieldable tread 4, the central portion of the rim being provided with a suitable filler 3'. Secured to a stepped portion of the floating rim are rub-plates 5, 5, that straddle corresponding rub-plates 6, 6, which are secured to the wheel-felly, the latter being provided with facings 6' of leather or other suitable material which is adapted to contact with the inner faces of the rub-plates 5 whereby a tight joint is formed between the floating rim rub-plates and felly plates to prevent dust from entering into the spring cavity between these members. The wheel felly and floating rim are each provided with a series of blocks 7, 7', respectively, which are arranged alternately as shown. At the ends of each block there is formed a centrally apertured circular groove 8, which groove is intersected by a straight groove or gutter 8' leading therefrom to the end of the block. As best shown in Fig. 1 each floating-rim block is secured to said rim by a pair of bolts 9, 9, which pass through the filler 3' of the rim and also through eyes 10 that are formed in the ends of coiled spring sections 11, 11, straight stretches of the coiled springs being seated within the groove 8' of the block, it being understood that the spring loops are interposed between the block and rim. The connection between the coiled spring sections 11 and the block 7 of the wheel felly is similar in construction in every respect to that just described in connection with the floating rim.

As shown in Fig. 3, the ends of the blocks are each formed with a straight face, which face is adapted to engage the end coils 11' of the connected spring sections, whereby the blocks engaging said coils form buffers that are adapted to receive the impact of load strain at the traction point of the wheel incidental to the intermediate coils of the spring sections being closed and thus it will be observed that when the coils of said springs are closed by this impact that they, in conjunction with the ends of the blocks, form oblique buffers to resist strain. This closing up of the coiled sections at the traction point will thereby prevent the floating rim from assuming an abnormal eccentric position relative to the wheel proper and will also serve to prevent straining or distention of those spring sections which are arranged diametrically opposite the traction point.

From the foregoing description it is apparent that by the arrangement and assemblage of spring sections that a rigid and resilient wheel will result, having the desired qualities of the pneumatic tire, while at the same time the said wheel is rendered proof against damage from punctures prevalent in tires of the said type.

I claim:

In a spring wheel having a wheel felly and a floating rim; the combination of alternate series of blocks disposed about the floating rim and felly, each block being provided with bolt apertures at its ends and having circular spring seats about the apertures, the said seats being intersected by end grooves, coiled springs having looped ends and straight stretches respectively seated within the circular grooves and the intersecting end grooves, bolts for securing certain of the spring loops, blocks and floating rim together, and bolts for securing other of the spring loops, blocks and wheel felly together.

In testimony that I claim the foregoing I have hereunto set my hand at Plymouth in the county of Sheboygan and State of Wisconsin in the presence of two witnesses.

WILLIAM A. LANGJAHR.

Witnesses:
 OTTO BERGEMANN,
 C. M. GRISWOLD.

---

Copies of this patent may be obtained for five cents each, by addressing the "Commissioner of Patents, Washington, D. C."